United States Patent
Perez et al.

Patent No.: US 6,704,823 B1
Date of Patent: Mar. 9, 2004

(54) METHOD AND APPARATUS FOR DYNAMIC ALLOCATION OF INTERRUPT LINES THROUGH INTERRUPT SHARING

(75) Inventors: Michael Anthony Perez, Cedar Park, TX (US); Louis Gabriel Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 09/620,723

(22) Filed: Jul. 20, 2000

(51) Int. Cl.[7] ............................................. G06F 13/24
(52) U.S. Cl. ...................................... 710/260; 710/266
(58) Field of Search ................................ 710/260–266, 710/8, 1, 301, 38, 310, 58

(56) References Cited

U.S. PATENT DOCUMENTS

| | | | | |
|---|---|---|---|---|
| 5,506,997 A | * | 4/1996 | Maguire et al. | 710/260 |
| 5,548,762 A | * | 8/1996 | Creedon et al. | 710/260 |
| 5,692,133 A | * | 11/1997 | Abert et al. | 710/301 |
| 5,768,598 A | * | 6/1998 | Marisetty et al. | 710/260 |
| 5,968,158 A | * | 10/1999 | Andrews et al. | 710/260 |
| 5,987,554 A | * | 11/1999 | Liu et al. | 710/310 |
| 6,085,279 A | * | 7/2000 | Suzuki | 710/264 |
| 6,397,284 B1 | * | 5/2002 | Sleeman et al. | 710/266 |

\* cited by examiner

*Primary Examiner*—Khanh Dang
*Assistant Examiner*—Kim T. Huynh
(74) *Attorney, Agent, or Firm*—Duke W. Yee; Mark E. McBurney; Wayne P. Bailey (57) ABSTRACT

A method and an apparatus is present for dynamically allocating a set of output interrupt lines at a host adapter to a set of input interrupt lines for card slots controlled by the host adapter. If the number of input interrupt lines is greater than the number of output lines, then interrupt sharing is necessary. The number of input interrupt lines can be determined automatically by scanning all the card slots or can be determined by values stored in lookup tables. The algorithm to determine a logical mapping of the input interrupt lines to the output lines, in cases where interrupt sharing is required, can be based on a number of factors. A simple approach is to distribute the interrupts as equally as possible. Another algorithm may take into account the expected frequency of interrupts based on the device involved. Yet another approach may use a set of predetermined priorities. Since these algorithms are implemented in firmware or software, they can be changed to meet a particular set of needs. Once the mapping is determined, the input interrupt lines are electronically connecting to the output interrupt lines using "glue logic" associated with the host adapter. After this mapping is accomplished, an interrupt mapping table is built and sent to the operating system.

25 Claims, 6 Drawing Sheets

100
Network
Figure 1

Figure 2

300
Client

METHOD AND APPARATUS FOR DYNAMIC ALLOCATION OF INTERRUPT LINES THROUGH INTERRUPT SHARING

BACKGROUND OF THE INVENTION

1. Technical Field

The present invention relates generally to an improved handling of interrupts and, in particular, to a method and an apparatus for managing interrupts between devices. Still more particularly, the present invention provides a method and an apparatus for dynamically allocating interrupts through a combination of hardware, firmware, and software.

2. Description of the Related Art

In a typical computer system, interrupts are handled via a host bridge between the devices plugged into card slots and the interrupt processing hardware and software. For example, in a PCI (Peripheral Component Interconnect) system there is a limited number of PCI interrupt inputs per PCI Host Bridge (PHB). These interrupt inputs must be distributed between all card slots and PCI bridges beneath the PHB. In a PCI system, each slot has four PCI interrupts. Single function devices only need one PCI interrupt while multifunction devices, such as a 4-port Ethernet adapter, may need up to four PCI interrupts.

The total number of interrupts available at the host bridge is typically less than the total maximum number of interrupt lines possible for all the card slots. For example, if a PHB is limited to 15 interrupt outputs and there are eight slots beneath a PHB, then 32 PCI interrupt inputs need to be distributed to the 15 PCI interrupt outputs on the PHB. This requires interrupt sharing, which can result in significant performance degradation.

These performance problems are particularly evident in a client-server model of computing where a single server must handle many clients. A 4-port Ethernet adapter card can service four clients at one time. If it is necessary to tie all four interrupts lines together, there will be a performance degradation of between 40–60 percent when compared with a 4-port Ethernet adapter that does not share interrupts. The last two ports also tended to have additional performance problems due to the nature of the interrupt polling software mechanism.

In today's e-business, internet/intranet environment, multiport adapters are becoming very common, especially in the ISP/Webserver market. Therefore, it would be advantageous to have a method and an apparatus that allows dynamic allocation of interrupt lines through an interrupt management scheme that can be programmed to produce a highly efficient computational system.

SUMMARY OF THE INVENTION

A method and an apparatus is present for dynamically allocating a set of output interrupt lines at a host adapter to a set of input interrupt lines for card slots controlled by the host adapter. If the number of input interrupt lines is greater than the number of output lines, then interrupt sharing is necessary.

The number of input interrupt lines can be determined automatically by scanning all the card slots or can be determined by values stored in lookup tables. The algorithm to determine a logical mapping of the input interrupt lines to the output lines, in cases where interrupt sharing is required, can be based on a number of factors. A simple approach is to distribute the interrupts as equally as possible. Another algorithm may take into account the expected frequency of interrupts based on the device involved. Yet another approach may use a set of predetermined priorities. Since these algorithms are implemented in firmware or software, they can be changed to meet a particular set of needs.

Once the mapping is determined, the input interrupt lines are electronically connecting to the output interrupt lines using "glue logic" associated with the host adapter. After this mapping is accomplished, an interrupt mapping table is built and sent to the operating system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
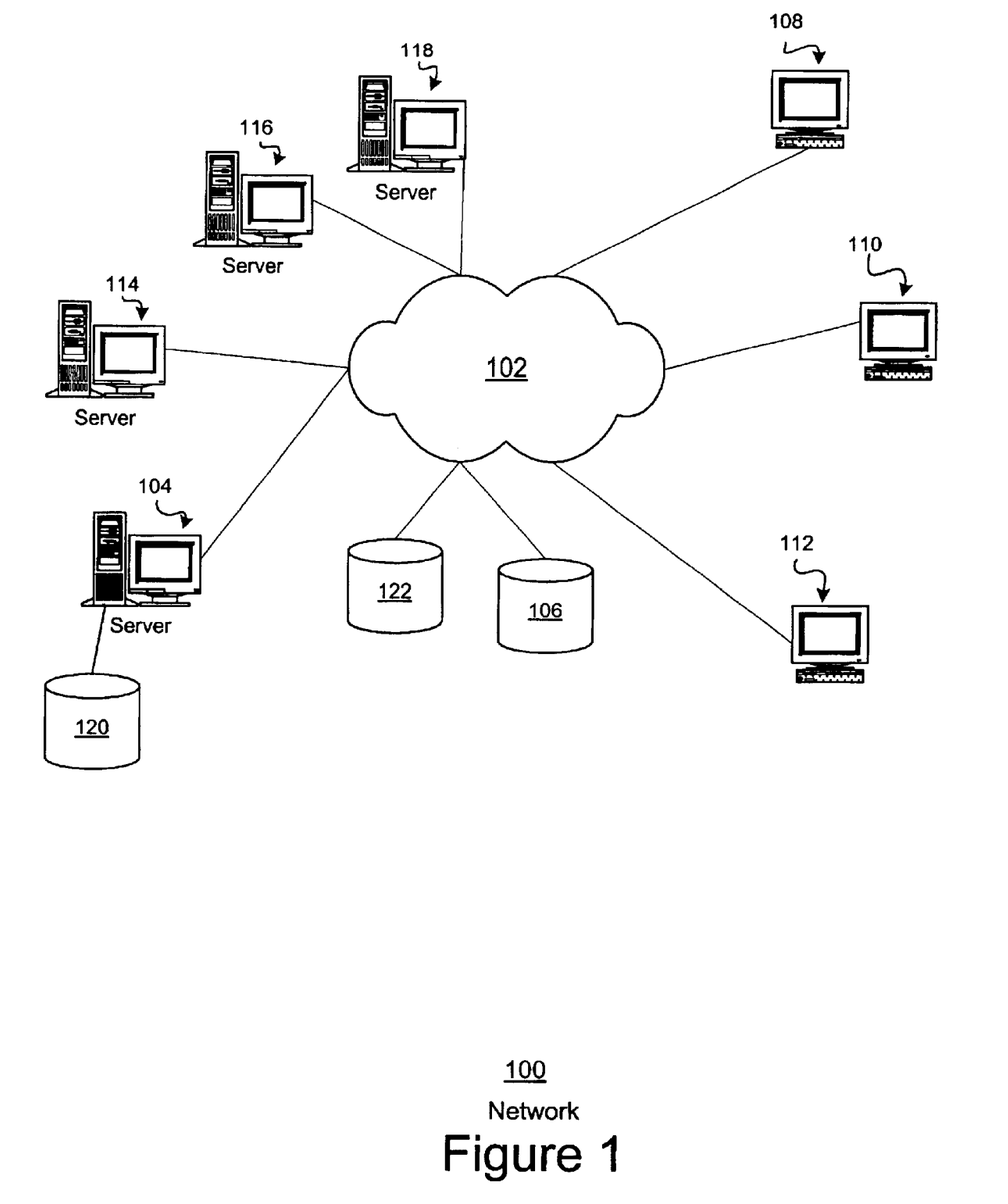
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112.

These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

Although not evident in this diagram due to limitations in drawing space, there are typically many client machines for each server machine. It is critically important that each server machine, which must handle requests from many clients, be configured to respond to client requests as rapidly as possible. In particular, a server machine may contain many 4-port Ethernet cards all competing for interrupt lines through the host bridge. Effective management of these interrupts is critical for improved performance in these server machines.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention.

Figure 2:
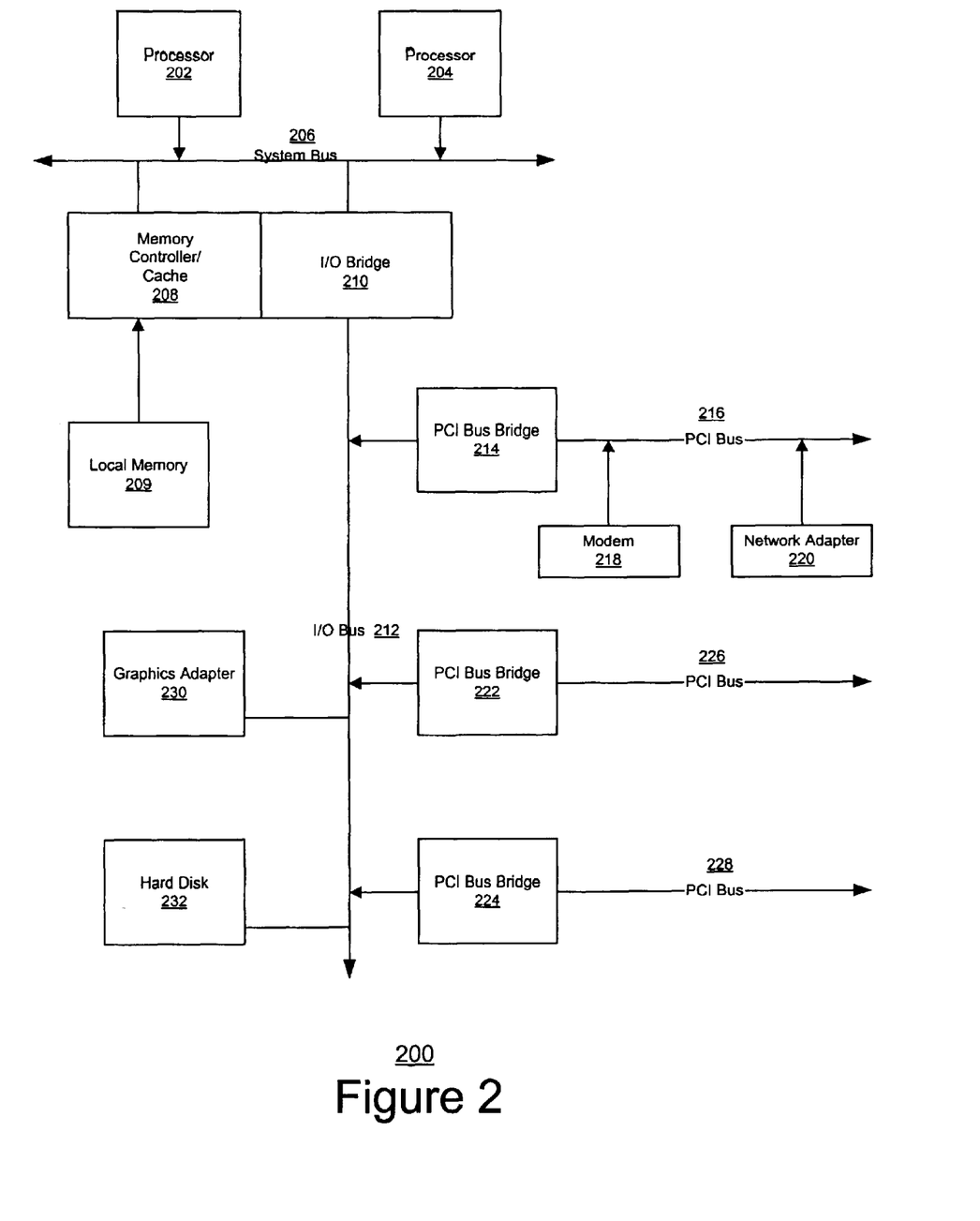
FIG. 2 is a block diagram of a data processing system that may be implemented as a server in which the present invention may be implemented.

Referring to FIG. 2, a block diagram of a data processing system which may be implemented as a server or client, such as server 104 or client 108 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

A typical server machine used in this invention will have several multiport Ethernet cards connected to each PCI bus bridge 214, 222 and 224. Often there are fewer interrupt lines available through each bus bridge than is required by all the Ethernet ports available. Ethernet ports can share interrupts but this will reduce overall system performance. It is important that interrupts be configured in a manner to maximize system performance. Since system demands also change with time, it is equally important to be able to change the configuration of these interrupts dynamically depending on system requirements.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, New York, running the Advanced Interactive Executive (AIX) operating system.

Figure 3:
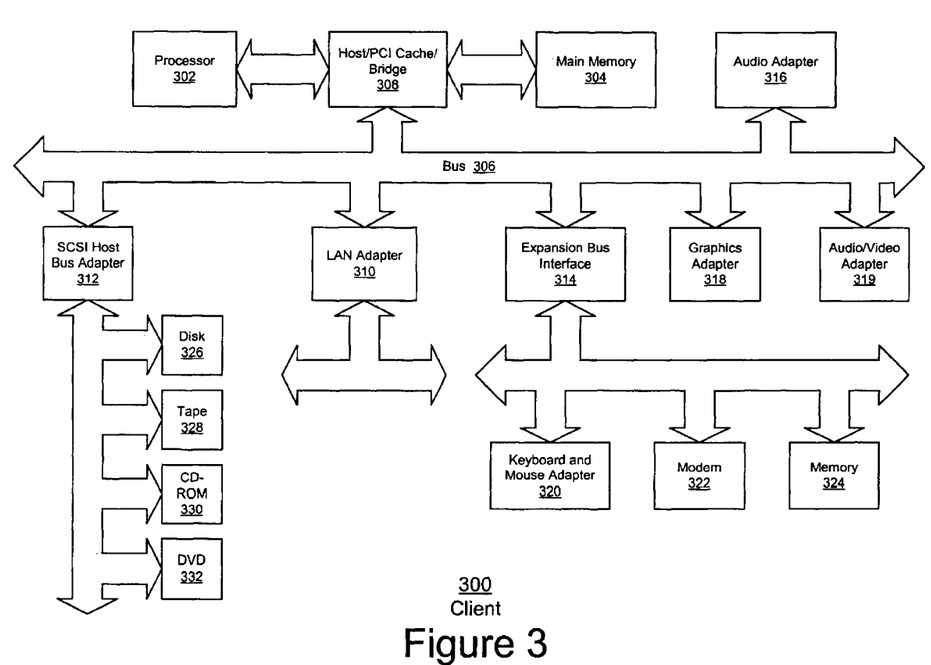
FIG. 3 is a block diagram of a data processing system that may be implemented as a client in a client-server network.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. If a client machine connects to many peripheral devices or acts as a server to a local area network, the present invention may prove to be useful. Although the discussion of this invention concentrates on improving server performance, this invention can be used in any computer system where multiple peripheral devices are connected via one or more host bridges to the computer system.

Figure 4:
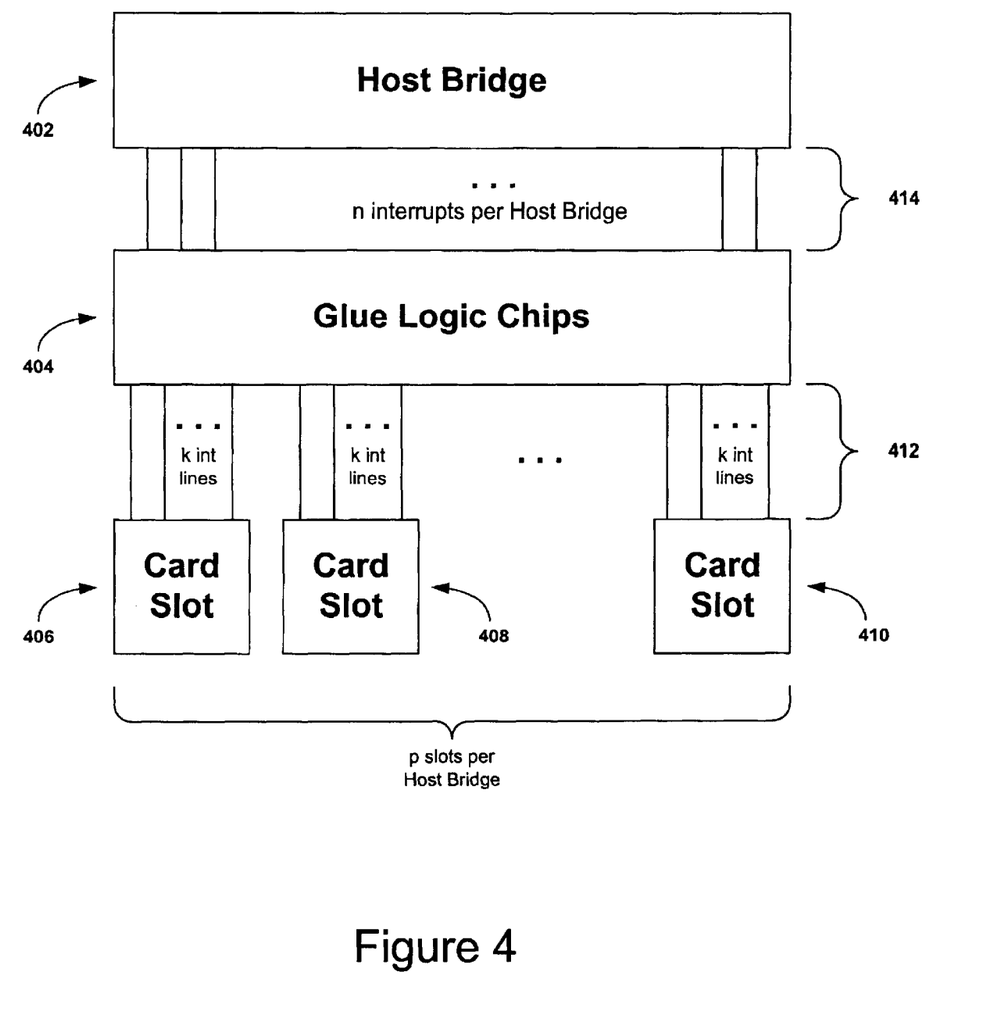
FIG. 4 is a block diagram of an interrupt management scheme used in the present invention.

Referring to FIG. 4, a block diagram of an interrupt handling system according to the present invention is shown. Host Bridge 402 provides an interface between the card slots and the interrupt processing system. This bridging is seen in FIG. 2 where PCI Bus Bridge 214 interfaced with modem 218 and network adapter 220. It is assumed that Host Bridge 402 can handle a maximum of "n" interrupt lines 414. The host bridge can accommodate multiple card slots. In FIG. 4 it is assumed a maximum of "p" card slots can be handled by Host Bridge 402. Card slots 406, 408, and 410 are shown, but "p" will typically be larger than this for a server system. Each card slot has a maximum of "k" interrupt lines 412. The maximum number of interrupt lines 412 for all card slots is p*k. Typically p*k is larger than n, thus resulting in the need to manage and share interrupts.

This invention involves glue logic chips 404 that combine hardware, firmware, and software to interface between the p*k interrupt lines from the card slots and the n interrupt lines allowed by the host bridge. Unlike prior systems where the interrupt sharing is determined by hardware and remains fixed, using the present invention, glue logic chips 404 can be configured dynamically. This invention is best understood by examining a particular example.

Figure 5:
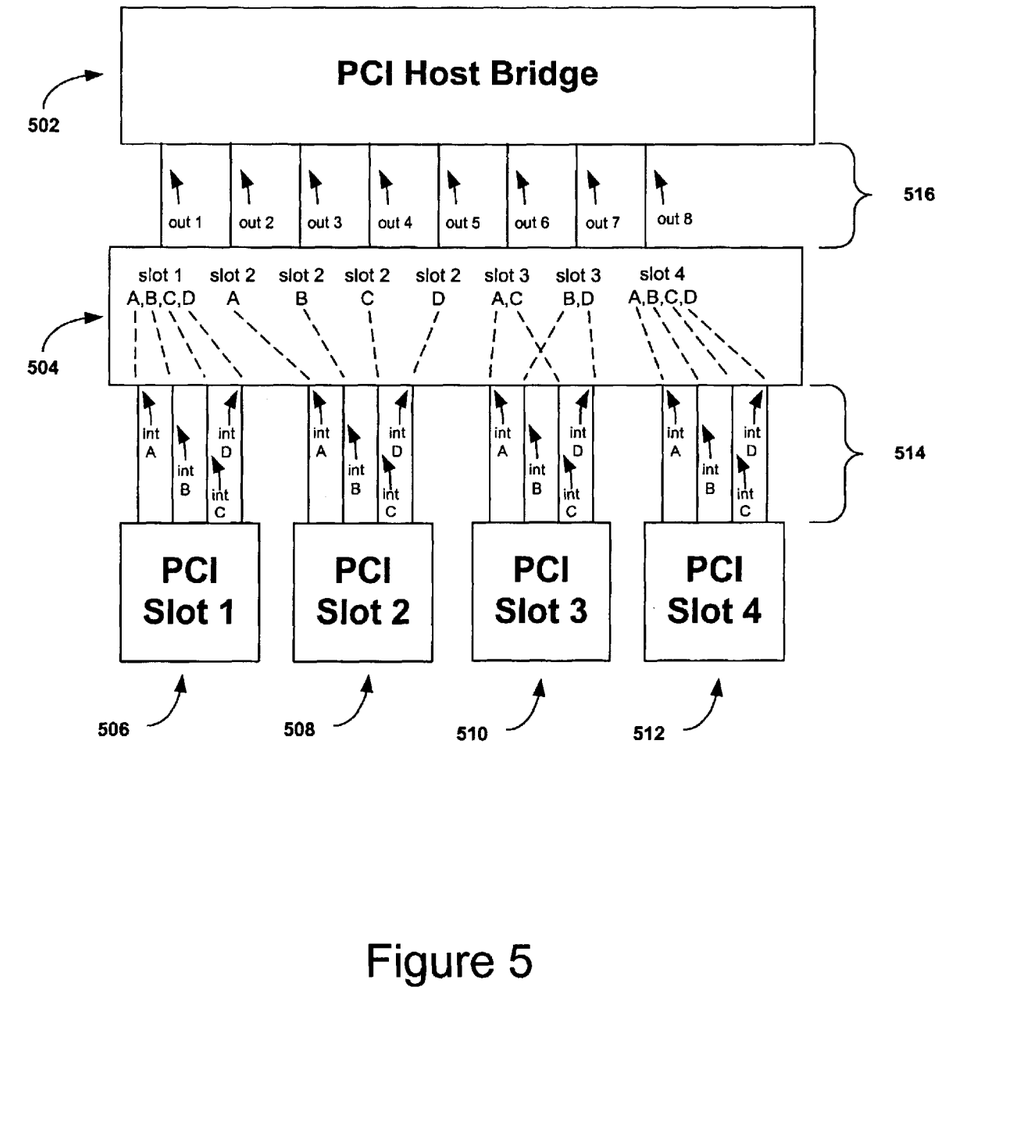
FIG. 5 is a block diagram showing the management of PCI interrupts used in a preferred embodiment of the present invention.

Referring to FIG. 5, a block diagram of a PCI interrupt handling system according to a preferred embodiment of the present invention is shown. Host Bridge 502 is part of a PCI bus system. Glue logic 504 configures the interrupt sharing from the interrupt lines 514 from the card slots to the interrupt lines 516 that feed PCI Host Bridge 502. In this particular example, there are four PCI card slots, 506, 508, 510, and 512, each with four interrupt lines A, B, C, and D. So there are 16 interrupt lines 514 from the card slots. Furthermore, it is assumed in this example there are eight interrupt lines 516 into PCI Host Bridge 502. Glue logic 504 configures the sharing of the 16 interrupt inputs to 8 interrupt outputs.

It is assumed each PCI card has up to four separate interrupt lines, but depending on the functionality of the card anywhere from 1 to 4 lines are actually used. In FIG. 5, the device in PCI Slot 1 506 only uses a single interrupt, so its four interrupt lines can be shared to product output 1 to PCI Host Bridge 502. In symbolic form one writes "out 1=slot 1 A,B,C,D". The device in PCI Slot 2 508 is assumed to be a 4-port Ethernet card that performs best if each port has a separate line. So "out 2=slot 2 A", "out 3=slot 2 B", "out 4=slot 2 C", and "out 5=slot 2 D".

The device in PCI Slot 3 510 is assumed to use only two of the four available interrupts. Therefore, glue logic 504 contains configuration "out 6=slot 3 A,C" and "out 7=slot 3 B,D" . The device in PCI Slot 4 512 uses a single interrupt, so the configuration is "out 8=slot 4 A,B,C,D". As one of ordinary skill in the art will appreciate, FIG. 5 illustrates only one particular mapping out of many possible mappings. In the prior art, the mapping was fixed in hardware and could not be changed. Using the present invention, the mapping is dynamically configurable and can be changed at run time.

Although not illustrated in the configuration shown in FIG. 5, it is possible to share interrupt lines from different card slots. The operating system maintains a list of devices that it must poll for each particular interrupt line into the host bridge. It is even possible to tie all interrupt lines from all unoccupied slots together. While this may make sense for a static situation where the hardware configuration does not change, it might lead to problems if devices are "hot" swappable while the system is running. If this is the case, the software associated with this invention would detect too many devices attached to a single interrupt line and display a request for the user to reboot the system in order to improve system performance. As part of the reboot process, the new devices will be detected and the mapping of the input interrupt lines from devices to the output lines at the host bridge would be dynamically changed to match the current system configuration.

Figure 6:
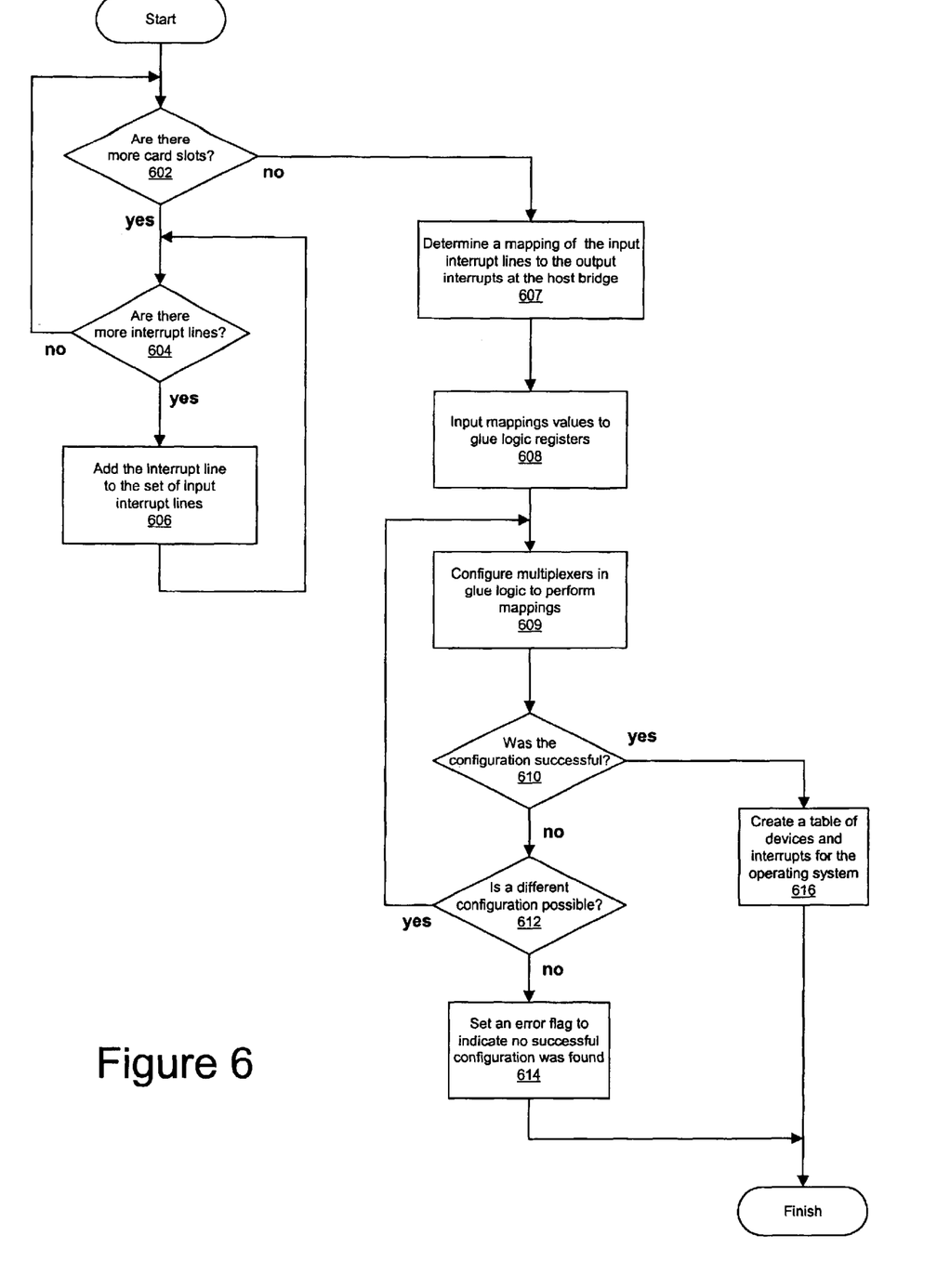
FIG. 6 is a flowchart illustrating an exemplary operation to manage interrupts dynamically according to the present invention.

Referring to FIG. 6, a flowchart for configuring interrupt lines in the glue logic is shown according to a preferred embodiment of the present invention. The first task is to discover the separate interrupt lines from the devices installed in the card slots for the system. We will assume each card slot can have multiple interrupt lines, as was shown in FIG. 5 for a PCI bus system with four interrupts A, B, C, and D. However, as one of ordinary skill in the art will appreciate, this scheme can be generalized to any system with more than one interrupt signal allowed for each card slot.

The discovery process "walks through" each of the card slots to discover the presence of controller cards and their associated interrupt lines. If there are no more card slots to be explored (step 602: No), then the discovery process is finished and control is sent to the mapping process (step 607). If there are more card slots to be explored (step 602: Yes), then the possible interrupt lines are tested for the next card slot. If there are no more interrupt lines for that card slot (step 604: No), then control is transferred to step 602 to test whether more unexplored card slots remain. If a new interrupt line is discovered (step 606: Yes), then this interrupt line is added to the set of input interrupt lines (step 606). Control then returns to step 604 to discover more interrupt lines for the card slot currently being explored.

The scheme shown in steps 602–606 is based on "self-discovery" each time the operation is invoked. It has the advantage of being the most flexible approach that can automatically detect the current hardware configuration. However, as one of ordinary skill in the art will appreciate, if the hardware configuration is fixed, then self-discovery may not be needed and a lookup table can be used instead. For example, for a PCI system, each controller device type is known to have a fixed number of interrupts from 1 to 4 based on the device ID. Rather than discover each interrupt line, this information can be retrieved from the lookup table based on each device ID.

The next step is to logically map the input interrupts from the card slots to the output interrupts at the host bridge (step 607). For example, using the lookup table approach for the configuration in FIG. 5, the lookup table for PCI Slot 1 506 would show that only one interrupt is needed, so output 1 is mapped to Slot 1 A,B,C,D. The lookup table for PCI Slot 2 508 would show there are four interrupts that, for best performance, should not be shared. This results in the mappings "out 2=slot 2 A", "out 3=slot 2 B", "out 4=slot 2 C", and "out 5=slot 2 D". This process continues until all PCI Slots have been explored. This mapping for the configuration shown in FIG. 5 was easy because interrupt sharing between separate, active interrupts was not required. If interrupt sharing is required, a variety of algorithms are possible, as will be discussed shortly.

The mappings determined in step 607 set values for registers in the glue logic (step 608). There are multiplexers (muxes) in the glue logic that are used to perform the desired connections. By setting the control signals to the muxes (step 609), an output is selected from a set of possible inputs. If the configuration is not successful (step 610: No), then it is determined if another configuration is possible. If no other configuration remains to be tested (step 612: No), then an error flag is set to indicate no configuration was found (step 614) and the operation is finished. If other configurations are possible, perhaps by combining interrupts at the price of decreased performance (step 612: Yes), then control is transferred to step 608 to try another configuration.

Under normal circumstances, by using interrupt sharing, it should be possible to always determine some configuration that will work. However, as will be discussed shortly, some algorithms might be very complex and be based on expected frequency of interrupts or a predetermined priority of a device. If the algorithm fails to find a suitable assignment of interrupt sharing, then an error flag should be set (step 614) and the algorithm would need to be modified to work properly for the configuration that caused the error.

If the configuration process is successful (step 610: Yes), then a table is created for the operating system that maps devices and interrupts (step 616). In the prior art, this table was built into the hardware and could not be changed dynamically. Using the glue logic and operations presented in this invention, this table can be changed dynamically at run time. Once the table is passed to the operating system, the operation is finished.

The operation presented in FIG. 6 is assumed to be part of the firmware associated with the glue logic. As one of ordinary skill in the art will appreciate, an alternative approach is to let the operating system implement the discovery process to build the interrupt mapping table. This alternative embodiment is not preferred since it would be slower and it would require additions to the operating system. However, it is an alternative available if the firmware approach can not be used.

This invention can be used to implement a number of different algorithms to determine interrupt sharing based on the configuration of the system and the performance needs of various devices. The easiest scheme is to share interrupts as "equally as possible." For example, suppose that six card slots are filled with each slot containing a 4-port Ethernet card. The ideal solution would be to have 24 separate interrupt lines, but this may not be possible. If there were only 15 interrupt lines available, then six of the host interrupt lines could be assigned uniquely to input interrupt lines and the remaining nine host interrupts lines would share two input interrupt lines. Sharing "as equally as possible" means the level of sharing differs by at most one interrupt line per group of interrupt lines.

Mathematically, this assignment can be determined in the following way. Let H be the number of interrupt lines available at the host bridge. Let R be the total number of required interrupt lines for the devices plugged into the card slots. If R<=H, then interrupt lines can be assigned uniquely, but if R>H then interrupt lines must be shared. To share "equally", (H−R mod H) host interrupt lines have to share (R div H) lines each and (R mod H) host interrupt lines have to share (R div H+1) lines each. The operations of integer division (div) and modular division (mod) are well understood by those of ordinary skill in the art. For the example given above, H=15 and R=24, so (H−R mod H)=(15−24 mod 15)=(15−9)=6 host interrupt lines have to share (R div H)=(24 div 15)=1 interrupt line each and (R mod H)=(24 mod 15)=9 host interrupt lines have to share (R div H+1)=(24 div 15+1)=(1+1)=2 interrupt lines each.

In other configurations, the card slots might be filled with a variety of devices where some devices have frequent interrupts and other devices have much less frequent interrupts. In this case, it would make sense to allow the devices with frequent interrupts to have their own interrupt lines while devices with infrequent interrupts could share a single interrupt line.

Yet another strategy is to predetermine priorities to particular devices and have the firmware maintain a table of priorities. When the interrupt lines are distributed, the higher priority devices might be assigned individual lines and low priority devices would share lines. If two or more devices have the same priority, then the interrupt lines available for that priority level could be shared on an equal basis.

The above scenarios illustrate three possible algorithms for distributing the available interrupt lines. As one of ordinary skill in the art will appreciate, other schemes are possible. What is important is that this invention can be adapted through firmware or software to meet a variety of needs based on the configuration and use of the computer system.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed:

1. A method in a data processing system for dynamically allocating a first set of interrupt lines connected to a host adapter, the method comprising the steps of:

detecting a second set of interrupt lines for each of a plurality of card slots controlled by the host adapter, wherein detecting the second set of interrupt lines is accomplished by storing a device table for a set of possible devices that can be plugged into the plurality of card slots and by detecting a device identification for each device plugged into the plurality of card slots;

logically mapping the detected second set of interrupt lines into the first set of interrupt lines;

electronically connecting the second set of interrupt lines from the plurality of card slots to the first set of interrupt lines; and building an interrupt mapping table for an operating system on the data processing system.

2. The method of claim 1, wherein the plurality of card slots is connected by a PCI (Peripheral Component Interconnect) system bus and the host adapter is a PCI Host Bridge (PHB).

3. The method of claim 1, wherein the logical mapping from the second set of interrupt lines into the first set of interrupt lines allows each interrupt from the second set of interrupts to be assigned a unique interrupt from the first set of interrupt lines.

4. The method of claim 1, wherein the logical mapping from the second set of interrupt lines into the first set of interrupt lines shares interrupt lines on an equal basis where the number of shared interrupt lines from the second set of interrupts for each interrupt line in the first set of interrupt line differs by no more than one interrupt line from the second set of interrupt lines.

5. The method of claim 1, wherein the logical mapping from the second set of interrupt lines into the first set of interrupt lines is based on sharing interrupt lines as determined by performance of devices plugged into the plurality of card slots.

6. The method of claim 1, wherein the logical mapping from the second set of interrupt lines into the first set of interrupt lines is based on sharing interrupt lines as determined by a predetermined set of priorities of devices plugged into the plurality of card slots.

7. The method of claim 1, wherein electronically connecting the second set of interrupt lines from the plurality of card slots to the first set of interrupt lines at the host adapter is performed based on register values set by the logical mapping from the second set of interrupt lines into the first set of interrupt lines.

8. An apparatus for dynamically allocating a first set of interrupt lines connected to a host adapter, the apparatus comprising:
   a detecting means for detecting a second set of interrupt lines for each of a plurality of card slots controlled by the host adapter, wherein the detecting means for detecting the second set of interrupt lines is accomplished by storing a device table for a set of possible devices that can be plugged into the plurality of card slots and by detecting a device identification for each device plugged into the plurality of card slots;
   a mapping means for logically mapping the detected second set of interrupt lines into the first set of interrupt lines;
   a connecting means for electronically connecting the second set of interrupt lines from the plurality of card slots to the first set of interrupt lines; and
   a recording means for building an interrupt mapping table for an operating system on the data processing system.

9. The apparatus of claim 8, wherein the plurality of card slots is connected by a PCI (Peripheral Component Interconnect) system bus and the host adapter is a PCI Host Bridge (PHB).

10. The apparatus of claim 8, wherein the mapping means for logically mapping from the second set of interrupt lines into the first set of interrupt lines allows each interrupt from the second set of interrupts to be assigned a unique interrupt from the first set of interrupt lines.

11. The apparatus of claim 8, wherein the mapping means for logically mapping from the second set of interrupt lines into the first set of interrupt lines shares interrupt lines on an equal basis where the number of shared interrupt lines from the second set of interrupts for each interrupt line in the first set of interrupt line differs by no more than one interrupt line from the second set of interrupt lines.

12. The apparatus of claim 8, wherein the mapping means for logically mapping from the second set of interrupt lines into the first set of interrupt lines is based on sharing interrupt lines as determined by performance of devices plugged into the plurality of card slots.

13. The apparatus of claim 8, wherein the mapping means for logically mapping from the second set of interrupt lines into the first set of interrupt lines is based on sharing interrupt lines as determined by a predetermined set of priorities of devices plugged into the plurality of card slots.

14. The apparatus of claim 8, wherein the connecting means for electronically connecting the second set of interrupt lines from the plurality of card slots to the first set of interrupt lines at the host adapter is performed based on register values set by the logical mapping from the second set of interrupt lines into the first set of interrupt lines.

15. The computer program product of claim 12, wherein the plurality of card slots is connected by a PCI (Peripheral Component Interconnect) system bus and the host adapter is a PCI Host Bridge (PHB).

16. A computer program product in a data processing system for dynamically allocating a first set of interrupt lines connected to a host adapter, the computer program product comprising:
   instructions for detecting a second set of interrupt lines for each of a plurality of card slots controlled by the host adapter, wherein the instructions for detecting the second set of interrupt lines use a device table for a set of possible devices that can be plugged into the plurality of card slots and use a device identification for each device plugged into the plurality of card slots to look up requirements for interrupt lines;
   instructions for logically mapping the detected second set of interrupt lines into the first set of interrupt lines;
   instructions for connecting the second set of interrupt lines from the plurality of card slots to the first set of interrupt lines; and
   instructions for building an interrupt mapping table for an operating system on the data processing system.

17. The computer program product of claim 16, wherein the instructions for logically mapping from the second set of interrupt lines into the first set of interrupt lines allow each interrupt from the second set of interrupts to be assigned a unique interrupt from the first set of interrupt lines.

18. The computer program product of claim 16, wherein the instructions for logically mapping from the second set of interrupt lines into the first set of interrupt lines share interrupt lines on an equal basis where the number of shared interrupt lines from the second set of interrupts for each interrupt line in the first set of interrupt line differs by no more than one interrupt line from the second set of interrupt lines.

19. The computer program product of claim 16, wherein the instructions for logically mapping from the second set of interrupt lines into the first set of interrupt lines share interrupt lines based on performance of devices plugged into the plurality of card slots.

20. The computer program product of claim 16, wherein the instructions for logically mapping from the second set of interrupt lines into the first set of interrupt lines share interrupt lines based on a predetermined set of priorities of devices plugged into the plurality of card slots.

21. The computer program product of claim 16, wherein instructions for connecting the second set of interrupt lines from the plurality of card slots to the first set of interrupt lines at the host adapter set register values based on the logical mapping from the second set of interrupt lines into the first set of interrupt lines.

22. The method of claim 1 wherein the second set of interrupt lines is greater in number than the first set of interrupt lines.

23. The method of claim 1 wherein at least one of the plurality of card slots contains a card operable to concurrently generate a plurality of interrupts.

24. The apparatus of claim 8 wherein the second set of interrupt lines is greater in number than the first set of interrupt lines.

25. The apparatus of claim 8 wherein at least one of the plurality of card slots contains a card operable to concurrently generate a plurality of interrupts.

* * * * *

UNITED STATES PATENT AND TRADEMARK OFFICE
CERTIFICATE OF CORRECTION

PATENT NO. : 6,704,823 B1
DATED : March 9, 2004
INVENTOR(S) : Perez et al.

It is certified that error appears in the above-identified patent and that said Letters Patent is hereby corrected as shown below:

<u>Column 10,</u>
Line 3, after "claim", delete "12" and insert -- 16 --

Signed and Sealed this

Second Day of August, 2005

JON W. DUDAS
*Director of the United States Patent and Trademark Office*